Oct. 7, 1952            A. AZANO            2,613,258
PROTECTIVE SIGNAL DEVICE FOR AUTOMOBILES
Filed Dec. 31, 1948            2 SHEETS—SHEET 1
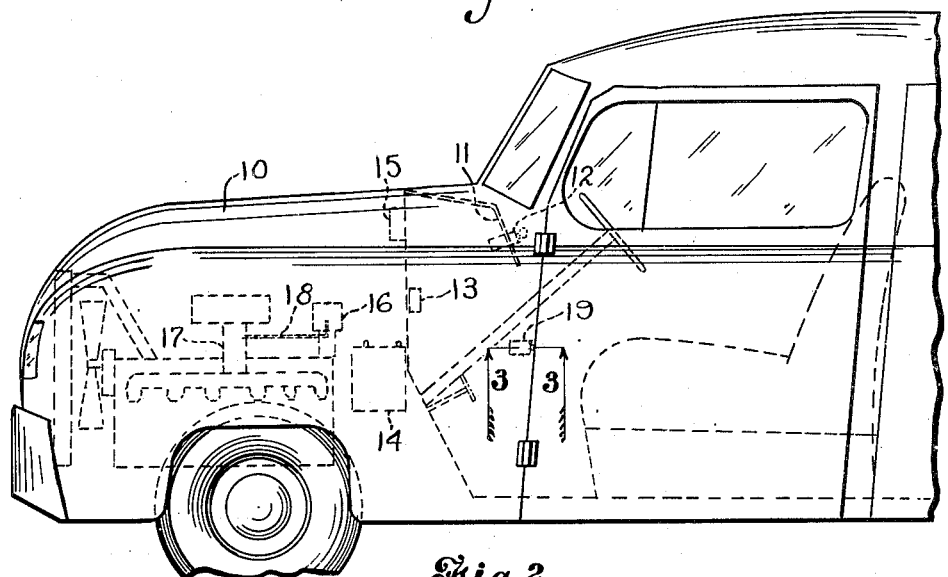
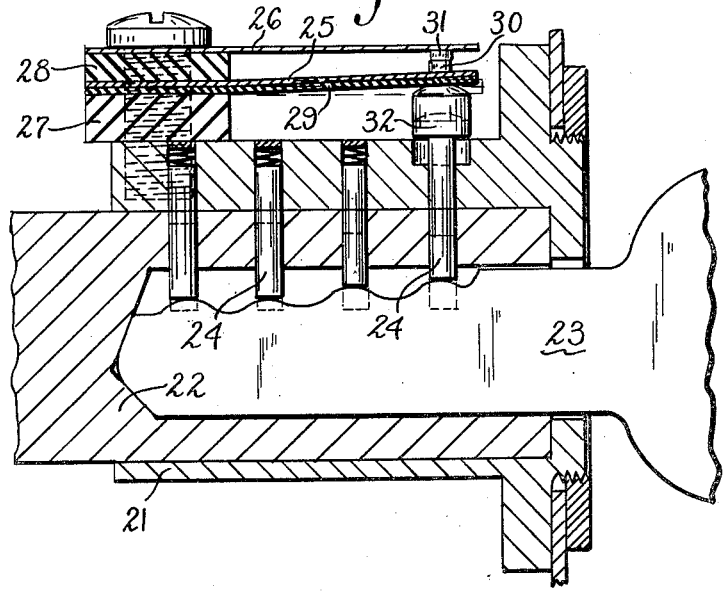
Inventor
Anthony Azano
By
Rockwell & Bartholow
ATTORNEYS

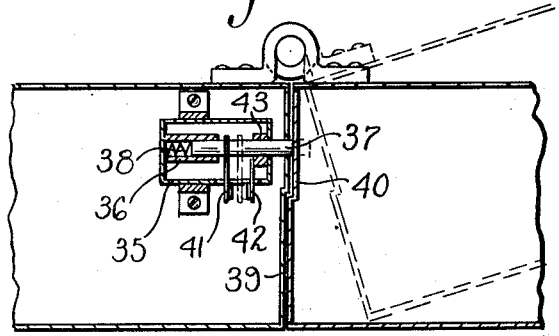
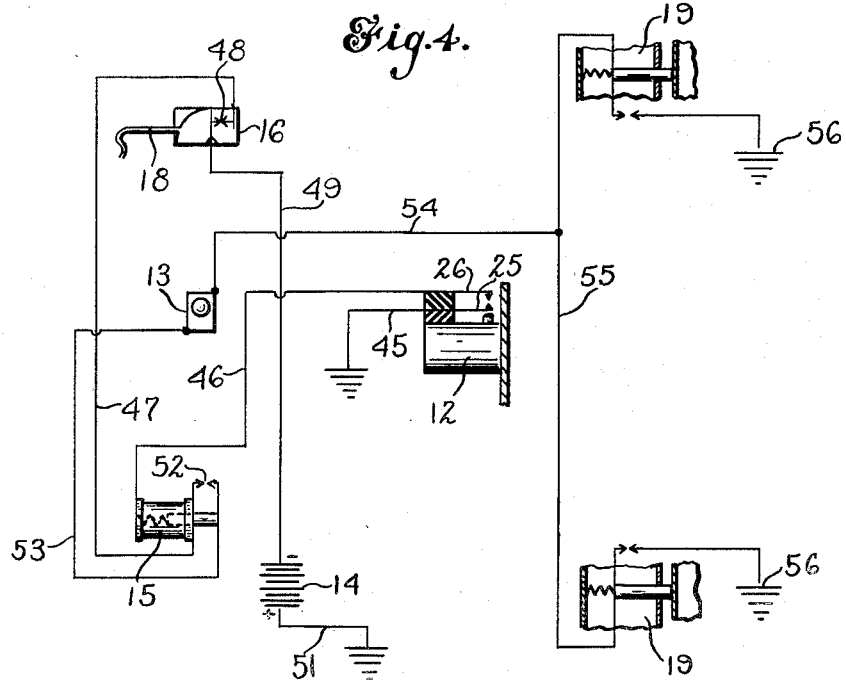

Patented Oct. 7, 1952

2,613,258

UNITED STATES PATENT OFFICE 2,613,258

PROTECTIVE SIGNAL DEVICE FOR AUTOMOBILES

Anthony Azano, New Haven, Conn.

Application December 31, 1948, Serial No. 68,675

4 Claims. (Cl. 177—311)

This invention relates to protective signal devices for automobiles and the like and, more particularly, to a device for warning the driver of an automobile when he is about to leave his car with the key in the ignition lock.

It is usual for automobiles to be provided with a lock for the ignition switch of the motor so that the motor cannot be started without the proper key. Many drivers, however, leave the ignition keys in the lock of the ignition switch when the car is not in use, thus rendering it an easy matter for an unauthorized person to start the motor. It has long been recognized by law enforcement officers that this is conducive to the theft of the vehicle, for in many instances where the automobile has been stolen it has been determined that the theft would not have occurred if the key had not been left in the lock and thus made the starting of the motor a very simple matter for anyone who could drive a car.

It is contemplated by the present invention to provide a protective signal system for automobiles to warn the driver when he is about to leave his car without removing the key from the ignition lock. It is, of course, undesirable for the signal or alarm to operate when the driver is in the car whether or not the key stands in the ignition lock, and, for this reason, the present arrangement is such that not only must the key be in the lock, but also the door of the car must be open for the signal to operate.

Also it is desirable that the driver be able upon occasion to leave his car with the engine running, or to open the door with the engine running, without the operation of the signal. Therefore, it is also contemplated by the present invention to so arrange the signal device that it is not only dependent upon the presence of the key in the lock and the opening of the door of the vehicle, but also dependent upon the non-operation of the motor. To effect this result, an electrical signal is provided, which signal is operated by the battery of the car through an electrical circuit, and this circuit is under control of three switches all of which must be closed before the signal will operate.

One of these switches is controlled by the ignition lock so that when the key is in the lock, this circuit will be closed. Another of the switches is controlled by the operation of the engine, and preferably by the vacuum in the engine manifold, so that this switch will be exposed to the vacuum in the manifold whenever the engine is running, and will break the circuit to the signal and thus prevent its sounding when the motor is in operation. The third switch in the circuit is controlled by the door of the automobile, or preferably either of the front doors of the vehicle, so that as long as the doors are closed the signal will not sound, but the opening of one of the doors will effect the closing of the switch contacts to complete the circuit so that when the operator leaves the vehicle, the signal will sound. In other words, the presence of the key in the lock closes one switch, the opening of the door closes a second switch, and the stopping of the engine permits the third switch to close. When all three of these switches are closed, the signal will operate.

One object of the present invention is to provide a protective signal device for automobiles such that an alarm will sound if the operator leaves the vehicle with the key standing in the ignition lock.

Another object of the invention is the provision of a protective signal device for automobiles such that a signal will operate if the driver leaves the vehicle with the key in the lock, and also to provide a disabling switch for the signal such that the signal will not be operated so long as the engine is running.

Still another object of the invention is to provide a signal system for an automobile, the system comprising a signal device and an electrical circuit connecting the signal device with a source of current such as the battery of the car, the circuit comprising three switches, one of which is closed by the insertion of the key in the lock, a second closed by the opening of the door, and the third one being closed when the motor is idle, but opened when the motor is in operation, whereby the signal will sound and will only sound when the motor is idle, the key stands in the ignition lock, and the door of the vehicle is open.

To these and other ends the invention consists of the novel features and combinations of part to be hereinafter described and claimed.

In the accompanying drawings:

Fig. 1 is an elevational view of the forward portion of a motor vehicle having my invention applied thereto;

Fig. 2 is a sectional view through the lock of the ignition switch;

Fig. 3 is a sectional view through the door-operated switch on line 3—3 of Fig. 1; and Fig. 4 is a simple wiring diagram showing one method of connecting the signal device with the battery of the car, together with the switches controlled by the presence of the key in the ignition lock, the vehicle motor and the door of the vehicle.

To illustrate a preferred embodiment of my invention, I have shown in Fig. 1 of the drawings a portion of a motor vehicle designated generally by the numeral 10 which is provided with a dash board 11 having mounted thereon the usual key-operated ignition lock 12. A buzzer 13 may be mounted at any convenient place in the car, which buzzer is the signal device designed to give an alarm to the driver when he is about to leave the car with the key standing in the lock. I have also shown diagrammatically a car battery at 14, a relay at 15, and a disabling switch 16 operated by the vacuum in the manifold of the vehicle motor, this switch being connected to the manifold 17 by the tube 18. Adjacent the door of the vehicle is shown a door switch 19 which, as will be explained hereinafter, is so arranged that the contacts of this switch are closed when the door is opened. It will be understood that usually one of these switches will be provided at each of the front doors of the vehicle, these switches being arranged parallel in the circuit which includes the buzzer and battery so that the closing of either of the switches by the opening of either door will complete that portion of the circuit.

As shown in Fig. 2, the ignition lock comprises a case 21 having a key barrel 22 within which is adapted to be inserted the proper key 23 to align the pin tumblers 24 so as to permit the rotation of the barrel in the case to close the ignition switch (not shown). While I have shown more or less diagrammatically the usual pin tumbler lock, it will be understood that the invention is not limited to any particular lock, the one here shown being by way of illustrating one form which may be conveniently employed.

Upon the lock case 21 are mounted a pair of switch blades 25 and 26, these blades being insulated from each other and from the lock case by insulating washers 27 and 28. Below the blade 25 is a strip of insulation 29 of substantially the same length and width as the blade 25 so as to insulate this blade from the pin which actuates it, as will be described hereinafter.

The blades 25 and 26 are provided with contact points 30 and 31 and, as will be understood, these blades are of resilient material and normally stand in such a position that the contact points 30 and 31 are separated. One of the pins 24, the forward pin as illustrated, is provided with a head 32 designed to contact the lower surface of the insulating strip 29 when the pin is raised, and thus raise the switch blade 25 from the dotted-line position shown in Fig. 2 to the full-line position shown in that figure, thus effecting contact between the switch points 30 and 31 closing the gap through this switch. It will be understood that this pin is raised when the key is inserted in the lock, but will be forced downwardly by the spring action of the switch blade 25 when the key is removed from the lock, so that the switch will stand in open position except when the key is in the lock.

As previously stated, a door-operated switch 19 is provided adjacent the hinged edge of each of the front doors of the vehicle, a simple type of such switch being shown in Fig. 3 of the drawings. As illustrated, this switch comprises a case 35 provided with a sleeve 36 in which is mounted a plunger 37 urged outwardly by the spring 38, which plunger is adapted to extend through an opening in the door jamb 39 and make contact with the hinged edge 40 of the door.

The plunger 37 carries a switch blade 41 designed to make contact with a cooperating switch blade 42 secured in the case upon an insulating block 43 so that, when the plunger is moved outwardly by its spring, the contacts 41 and 42 will be closed to complete the circuit through the switch.

As will be obvious from Fig. 3, when the door of the vehicle is closed, as shown in full lines, the switch plunger 37 will be forced inwardly or to the left and thus open the gap between the contacts 41 and 42. When, however, the door is open, as shown in dotted lines, the plunger 37 will be forced outwardly or to the right by the spring 38, thus closing the contacts 41 and 42.

Also, as stated, I provide a vacuum switch 16 which may be of the usual form, this switch being shown diagrammatically at 16 in Figs. 1 and 4. This switch is connected to the manifold of the engine so that when the engine is in operation the vacuum attaining in the manifold will draw the switch contacts apart and open the gap between these contacts so that the circuit controlled by the switch will be opened as long as the motor is running. As soon, however, as the motor is idle, the switch contacts will close and thus permit the closing of the circuit through these contacts.

In Fig. 4 of the drawings, I have illustrated diagrammatically the circuits connecting the various elements of the signal system and provided, as stated, for the operation or sounding of the signal upon the concurrence of three factors, namely, the presence of the key in the lock, the opening of the door, and the motor of the vehicle being idle.

As illustrated, the switch blade 25, which is actuated by the key 23, is grounded by the wire 45, and the cooperating switch blade 26 is connected by the wire 46 to the relay 15, the other terminal of which relay is connected by a wire 47 to the vacuum switch 16. This vacuum switch is shown as provided with switch points 48, one of which is connected to the wire 47 and the other one being connected by the wire 49 to one terminal of the automobile battery 14, the other terminal of which is grounded by the wire 51. The relay is adapted to close switch gap 52, from one of the contacts of which a wire 53 leads to one terminal of the buzzer 13. From the other terminal of the buzzer a wire 54 leads to a wire 55 which in turn is connected to one terminal of each of the door switches 19, the other terminal of each of these switches being grounded at 56.

From the above wiring diagram, it will be seen that current flows from the battery 14 through the vacuum switch 16, through the relay switch 15, the buzzer 13 and one of the door switches 19 to complete the circuit to the ground 56. Thus, the circuit through the buzzer includes three switches, one of which is closed by the absence of vacuum in the motor, another closed through the relay by the presence of the key in the lock 12, and a third closed by the opening of the door. With this arrangement, as will be apparent, all three of these switches must be closed in order to sound the buzzer 13. Thus, when the driver opens the door to leave the vehicle with the motor out of operation and the key standing in the lock 12, the buzzer will sound, thus giving a signal that the key has been left in the lock.

When the key is removed from the lock, the circuit to the buzzer is opened and the latter will not operate. It will, of course, be obvious that just as the withdrawal of the key from the lock opens the circuit to the buzzer, it could also be employed to open the circuits to other electrical instruments of the car, such for example as the heater, the cigar lighter, the radio, or the ammeter.

A similar signal system may also be employed for notifying the driver that his brake linings are excessively worn. For this purpose the circuit would include the rivets with which the brake linings are secured to the brake bands and, when these rivets engage the brake drums, the circuit would be completed to sound a signal or light a lamp and thus warn the operator that the brakes were in need of relining. If desired, instead of the buzzer shown in the present drawings, a signal light may be mounted on the dash to act as a signal to the driver when the key is left in the lock, although an audible signal may be preferable as the light might not be seen.

While I have shown and described a preferred embodiment of my invention, it will be understood that it is not to be limited to all of the details shown, but is capable of modification and variation within the spirit of the invention and within the scope of the claims.

What I claim is:

1. A signal system for an automobile having an ignition lock and a key to operate said lock, said system comprises an electrical circuit including, in series, a signal, a source of current, a switch actuated by movement of the door of the automobile, and a second switch to connect the circuit to said current source, and means for closing said second switch, said means comprising a normally open circuit closed by the insertion of the key in the lock and by lack of suction in the motor.

2. A signal system for an automobile having an ignition lock and a key to operate said lock, said system comprising a main circuit and an auxiliary circuit, said main circuit including, in series, a source of current and a switch adjacent the lock and closed by the insertion of the key in the lock, said auxiliary circuit including a source of current, a signal device and a switch, means to condition said auxiliary circuit for operation upon the closing of the main circuit, and means to close said switch in the auxiliary circuit by the movement of the door of the automobile, said main circuit also including in series a switch actuated by the suction of the automobile motor.

3. A signal system for an automobile having an ignition lock and a key to operate said lock, said system comprising a main circuit and an auxiliary circuit, said main circuit including, in series, a source of current and a switch adjacent the lock and closed by the insertion of the key in the lock, said auxiliary circuit including a source of current, a signal device and a switch, means to condition said auxiliary circuit for operation upon the closing of the main circuit, and means to close said switch in the auxiliary circuit by the movement of the door of the automobile, said main circuit also including, in series, a switch actuated to open the circuit by suction within the automobile motor.

4. A signal system for an automobile having an ignition lock and a key to operate said lock, said system comprising a main circuit and an auxiliary circuit, said main circuit including, in series, a source of current and a switch adjacent the lock and closed by the insertion of the key in the lock, said auxiliary circuit including a source of current, a signal device and a switch, means to condition said auxiliary circuit for operation upon the closing of the main circuit, and means to close said switch in the auxiliary circuit by the movement of the door of the automobile, said auxiliary circuit being normally disconnected from its source of current and said conditioning means including a relay in the main circuit to its source of current, and wherein the main circuit includes, in series, a switch actuated by the suction of the automobile motor.

ANTHONY AZANO.

REFERENCES CITED

The following references are of record in the file of this patent:

UNITED STATES PATENTS

| Number | Name | Date |
|---|---|---|
| 1,330,206 | McQuarrie | Feb. 10, 1920 |
| 1,673,647 | Strang | June 12, 1928 |
| 1,957,106 | Kerzak | May 1, 1934 |
| 2,339,170 | Jacobs | Jan. 11, 1944 |
| 2,349,740 | McCollum | May 23, 1944 |
| 2,439,634 | Robey | Apr. 13, 1948 |

FOREIGN PATENTS

| Number | Country | Date |
|---|---|---|
| 320,825 | Great Britain | Oct. 24, 1929 |